United States Patent
Yoon

(10) Patent No.: US 8,332,882 B2
(45) Date of Patent: Dec. 11, 2012

(54) SPINDLE MOTOR HAVING A CHUCK CLIP

(75) Inventor: Hoeop Yoon, Seoul (KR)

(73) Assignee: LG Innotek Co., Ltd., Seoul (KR)

( * ) Notice: Subject to any disclaimer, the term of this patent is extended or adjusted under 35 U.S.C. 154(b) by 239 days.

(21) Appl. No.: 12/868,430

(22) Filed: Aug. 25, 2010

(65) Prior Publication Data

US 2011/0055858 A1 Mar. 3, 2011

(30) Foreign Application Priority Data

Aug. 25, 2009 (KR) .................. 10-2009-0078528

(51) Int. Cl.
*G11B 17/028* (2006.01)

(52) U.S. Cl. ....................................... 720/707

(58) Field of Classification Search .............. 720/703, 720/704, 706, 707, 709, 724
See application file for complete search history.

(56) References Cited

U.S. PATENT DOCUMENTS

| | | | | |
|---|---|---|---|---|
| 4,768,185 A | * | 8/1988 | Camerik | 720/710 |
| 5,501,760 A | * | 3/1996 | Mukawa | 156/305 |
| 5,555,233 A | * | 9/1996 | Yano et al. | 720/709 |
| 5,583,717 A | * | 12/1996 | Nakata et al. | 360/99.06 |
| 5,799,006 A | * | 8/1998 | Mukawa | 720/707 |
| 6,871,352 B2 | * | 3/2005 | Kurosaka et al. | 720/707 |
| 7,036,135 B2 | * | 4/2006 | Hsu et al. | 720/707 |
| 7,343,610 B2 | * | 3/2008 | Shibata | 720/713 |
| 7,849,474 B2 | * | 12/2010 | Kuramoto et al. | 720/707 |
| 7,979,873 B2 | * | 7/2011 | Ito et al. | 720/707 |
| 8,024,751 B2 | * | 9/2011 | Yoon | 720/712 |
| 8,065,693 B2 | * | 11/2011 | Lee | 720/707 |
| 2003/0107984 A1 | * | 6/2003 | Yamaguchi | 369/270 |

FOREIGN PATENT DOCUMENTS

KR 10-2004-0001315 A 1/2004

OTHER PUBLICATIONS

Office Action dated Feb. 24, 2011 in Korean Application No. 10-2009-0078528, filed Aug. 25, 2009.

* cited by examiner

*Primary Examiner* — Angel A. Castro
(74) *Attorney, Agent, or Firm* — Saliwanchik, Lloyd & Eisenschenk

(57) ABSTRACT

Disclosed is a spindle motor including a rotor yoke coupled with a rotation axis and having an optical disk mounted thereon; a clamp case that is arranged on the rotor yoke, inserted into an inner side of the optical disk and has a receiving groove formed on the side thereof; and a chuck clip having one side fixed to the clamp case corresponding to the receiving groove and the other side that elastically supports the inner side of the optical disk, the other side being corresponding to the one side.

12 Claims, 2 Drawing Sheets

SPINDLE MOTOR HAVING A CHUCK CLIP

CROSS-REFERENCE TO RELATED APPLICATION

This application claims the benefit under 35 U.S.C. §119 of Korean Patent Application No. 10-2009-0078528, filed on Aug. 25, 2009, which is hereby incorporated by reference in its entirety.

BACKGROUND

1. Field of the Invention

The present disclosure relates to a spindle motor used for a slim type optical disk drive such as a notebook computer.

2. Description of the Related Art

Generally, a slim type spindle motor includes a stator fixed to a base plate and a rotor coupled with a rotation axis rotating with respect to the stator, and an optical disk is coupled with a rotor yoke of the rotor. The rotor yoke has a clamp case mounted thereon in order to prevent the optical disk from leaving from the rotor yoke.

The clamp case includes a chucking arm and an elastic spring. The elastic spring is arranged inside the clamp case and the chucking arm is coupled with the elastic spring. When the optical disk is mounted on the rotor yoke, the chucking arm elastically supports the inner circumference plane of the optical disk.

Since a slim type spindle motor in the art has the chucking arm and elastic spring included in the clamp case, it has problems that its structure is complicated and it takes much time to assemble the chucking arm and elastic spring into the clamp case.

BRIEF SUMMARY

According to the present disclosure, there is provided a spindle motor having an integral chucking member mounted in a case in replacement of a chucking arm and an elastic spring, in order to solve the problems described above.

The technical problems to be solved by the present disclosure are not limited to the technical problems described above and those skilled in the art will understand that other technical problems that have not been mentioned will be covered by the following description.

As an embodiment of the present disclosure, a spindle motor may include a rotor yoke coupled with a rotation axis and having an optical disk mounted thereon; a clamp case that is arranged on the rotor yoke, inserted into an inner side of the optical disk and has a receiving groove formed on the side thereof; and a chuck clip having one side fixed to the clamp case corresponding to the receiving groove and the other side that elastically supports the inner side of the optical disk, the other side being corresponding to the one side.

BRIEF DESCRIPTION OF THE DRAWINGS

The accompanying drawings, which are included to provide a further understanding of the disclosure and are incorporated in and constitute a part of this application, illustrate embodiments of the disclosure and together with the description, serve to explain the principle of the disclosure. In the drawings.

DETAILED DESCRIPTION

Hereinafter, an embodiment of the present disclosure will be described with reference to the accompanying drawings.

Figure 1:
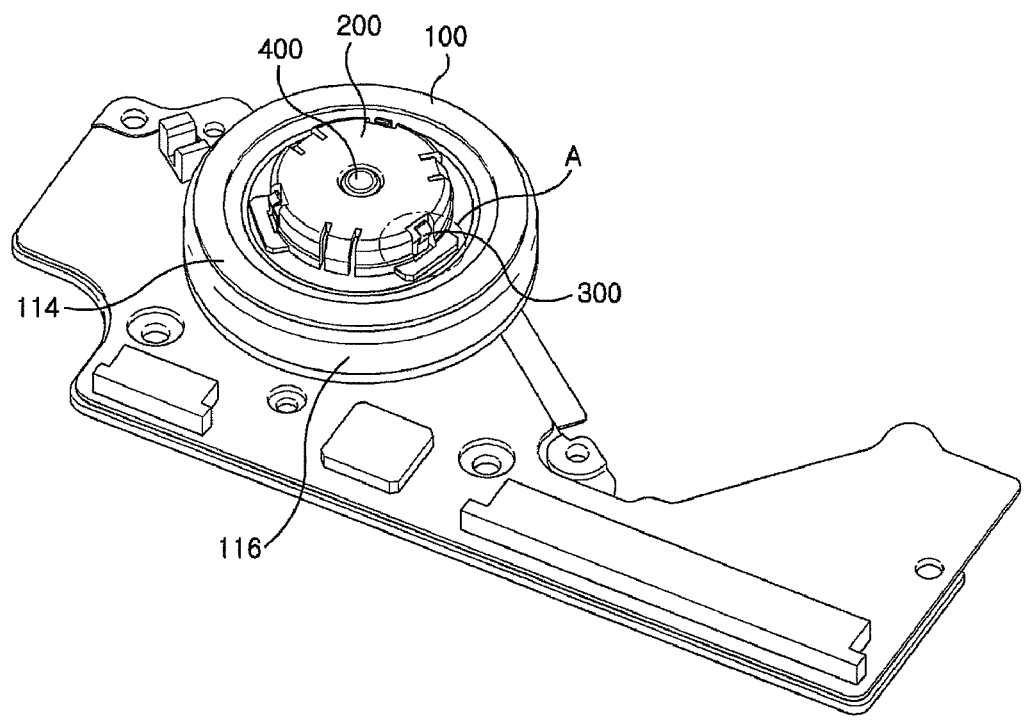
FIG. 1 is a perspective view showing a spindle motor according to an embodiment of the present disclosure.
Figure 2:
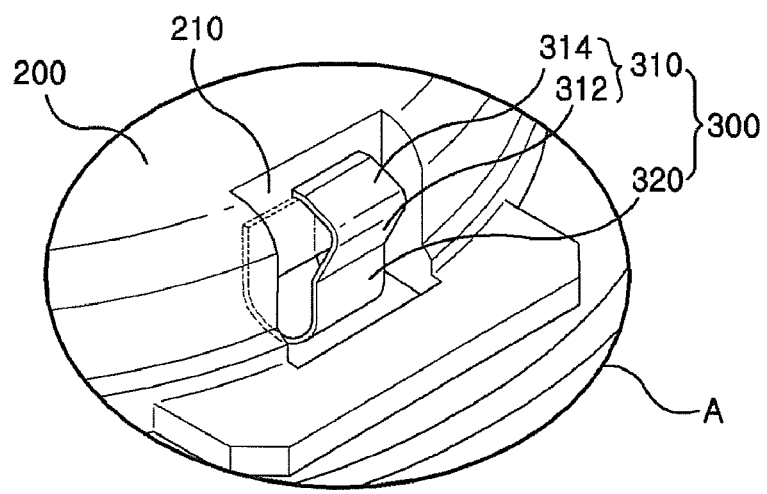
FIG. 2 is an enlarged view of 'A' portion in FIG. 1.
Figure 3:
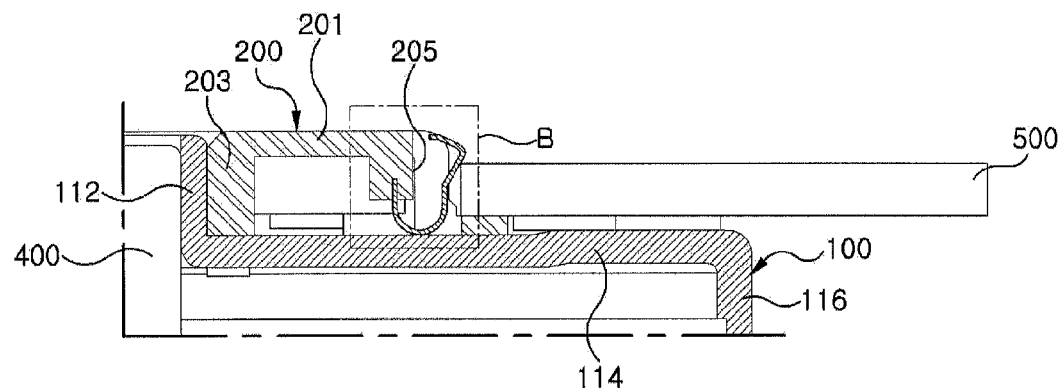
FIG. 3 is a sectional view showing a portion of a spindle motor shown in FIG. 1.
Figure 4:
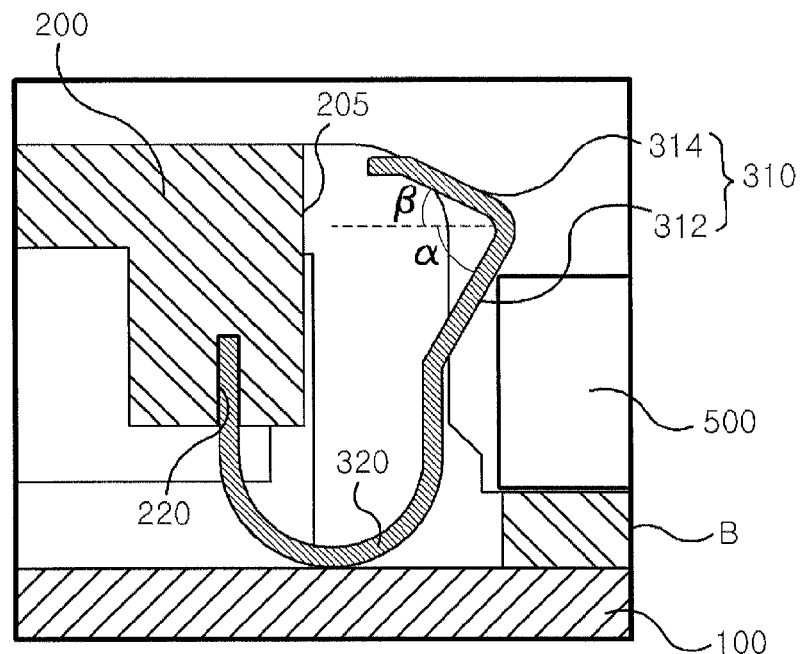
FIG. 4 is a partial enlarged view of 'B' in FIG. 3.

FIG. 1 is a perspective view showing a spindle motor according to an embodiment of the present disclosure. FIG. 2 is an enlarged view of 'A' portion in FIG. 1. FIG. 3 is a sectional view showing a portion of a spindle motor shown in FIG. 1, FIG. 4 is a partial enlarged view of 'B' in FIG. 3.

Referring to FIGS. 1 to 4, the spindle motor includes a rotor 100, a clamp case 200 and a chuck clip 300.

The rotor 100 includes a rotor yoke 110 and a magnet (not shown). The rotor yoke 110 is coupled with a rotation axis 400 and rotated together with the rotation axis 400. Further, the rotor yoke 110 serves to support an optical disk.

According to an embodiment of the present disclosure, the rotation axis 400 is rotated by a stator.

The stator includes a bearing housing formed in a cylinder shape having an open top, a pipe-shaped bearing that is coupled in the bearing housing and used to rotatably fix the rotation axis 400, a core coupled to the outer circumference plane of the bearing housing, and a coil wound on the core, for example.

The rotor yoke 110 of the rotor 100 is formed in a cylinder shape having an open bottom, and the rotor 100 includes a yoke top plate 114 and a yoke side plate 116.

The yoke top plate 114 is formed in a disc shape to support an optical disk, for example. A pipe-shaped burring portion 112 extending from the bottom plane of the yoke top plate 114 to the top plane of the yoke top plate 114 is formed in the center of the yoke top plate 114, and the rotation axis 400 is pressed into the burring portion 112.

The yoke side plate 116 is extended from the edge of the yoke top plate 114, so that the yoke side plate 116 faces the core.

The clamp case 200 is coupled with the burring portion 112 of the rotor yoke 100. The clamp case 200 assigns the rotation center of the optical disk 500 in the rotation center of the rotation axis 400 so that the rotational defect of the optical disk caused by the eccentric mass of the optical disk 500 is prevented.

The clamp case 200 includes a top plate 201, an inner plate 203 and an outer plate 205.

The top plate 201 of the clamp case 200 is formed in a doughnut shape having internal and external diameters when viewed on the plane.

The inner plate 203 of the clamp case 200 is extended from the internal diameter of the top plate 201 and then coupled with the burring portion 112 of the rotor yoke 100. According to an embodiment of the present disclosure, the inner plate 203 is formed with a first height.

The outer plate 205 of the clamp case 200 is extended from the external diameter of the top plate 201, and the external plate 205 is arranged to meet the inner plate 203. According to an embodiment of the present disclosure, the inner plate 203 is formed with a second height greater than the first height.

Since the outer plate 205 of the clamp case 200 is formed with a height smaller than that of the inner plate 203 thereof, when the inner plate 203 is arranged on the yoke top plate 114 of the rotor yoke 100, the outer plate 205 is detached from the yoke top plate 114 of the rotor yoke 100 in a predetermined gap.

The outer plate 205 of the clamp case 200 has a plurality of receiving grooves 210 formed thereon, and each of the receiving grooves 210 is formed concaved starting from the surface of the outer plate 205 in the direction facing the rotation axis 400.

The receiving grooves 210 are formed on the outer plate 205 of the clamp case 200 in a predetermined gap therebetween. According to an embodiment of the present disclosure, the receiving grooves 210 formed on the outer plate 205 are 3, for example. Each receiving groove 210 provides a space to receive a chuck clip 300 to be described.

The outer plate 205 corresponding to each of the receiving grooves 201 of the clamp case 200 has a coupling groove 220 formed in the direction facing upward from the bottom plane of the outer plate 205.

The chuck clip 300 coupled with a coupling groove 220 of the outer plate 205 of the clamp case 200 elastically supports the optical disk 500 and it is contacted with the inner side of the optical disk to support the optical disk elastically. The chuck clip 300 according to an embodiment of the present disclosure serves as a spring and a chucking arm included in a spindle motor in the art in a part.

The chuck clip 300 according to an embodiment of the present disclosure is formed by bending a metal plate having an excellent durability to contact with the optical disk and support the inner side of the optical disk elastically.

The chuck clip 300 includes first and second clip portions 310 and 320.

The first clip portion 310 is coupled with the inner side of an optical disk 500, and the second clip portion 320 is bent in a curved line shape to be coupled with a coupling groove 220 formed on the bottom plane of the outer plate 205. The second clip portion 320 may be bent in a shape of 'L' or the like, rather than a curved line.

Some of the second clip portion 320 bent in a curved line shape is contacted with the top plate 114 of the rotor yoke 100.

According to an embodiment of the present disclosure, the second clip portion 320 is bent in a 'U' shape, for example, to have a high elasticity in the radial direction of the claim case 200. Additionally, the second clip portion 320 may be formed in various shapes other than 'U' shape.

In order that the inner side of the optical disk is elastically supported using the first clip portion 310, the first clip portion 310 includes first and second inclined planes 312 and 314.

The first inclined plane 312 is outwardly bent with respect to the outer plate 205 of the clamp case 200 at an angle, and the second inclined plane 314 is inwardly bent from the end portion of the first inclined plane 312 so that the first and second inclined planes 312 and 314 are formed to have an obtuse angle therebetween.

According to an embodiment of the present disclosure, a bent portion formed by bending the first and second inclined planes 312 and 314 is projected out of the receiving groove 210.

The second inclined plane 314 connected to the first inclined plane 312 makes it easy to couple the optical disk with the top plane of the rotor yoke 100 when the optical disk is coupled toward the rotor yoke 100, and the first inclined plane 312 makes it easy to separate the optical disk from the rotor yoke 100 when the optical disk is separated from the rotor yoke 100. According to an embodiment of the present disclosure, the first inclined plane 312 and the inner side of the optical disk form an acute angle therebetween.

According to an embodiment of the present disclosure, an inclined angle $\alpha$ formed between the first inclined plane 312 and the yoke top plate 114 of the rotor yoke 100 is relatively greater than an inclined angle $\beta$ formed between the second inclined plane 314 and the yoke top plate 114 of the rotor yoke 100, so that the optical disk 500 may be separated from the rotor yoke 100 with more ease.

Since the second inclined plane 314 has an inclined angle smaller than that of the first inclined plane 312, when a user pushes the optical disk arranged on the second inclined plane 314, the second inclined plane 314 is elastically curved and the optical disk is arranged on the yoke top plate 114 of the rotor yoke 100 with ease.

Since the first inclined plane 312 has an inclined angle greater than that of the second inclined plane 314, a user can separate the optical disk coupled with the first inclined plane 311 from the clamp case 200 with more ease.

Since the second clip portion 320 permits an elastic deformation acting in the radial direction and at the same time the first clip portion 310 permits an elastic deformation acting in the up and down direction, the chuck clip 300 including the first and second clip portions 310 and 320 is included in the spindle motor in the art and can serve as a spring and a chucking arm that are coupled with or separated from the optical disk.

While the first and second inclined planes 312 and 314 of the first clip portion 310 included in the chuck clip 300 are shown and described to be bent at an obtuse angle, for example, according to an embodiment of the present disclosure, the first clip portion 310 may be bent having a curved plane.

As described above, it can be appreciated that the basic technical idea of the present disclosure is to provide a spindle motor capable of largely reducing manufacturing time, cost and raw material by reducing unnecessary parts and detachably coupling the optical disk with ease.

Hereinbefore, while the embodiments of the present disclosure are described, they are exemplary ones only and one of ordinary skill in the art may recognize that various alterations and modifications that fall within the scope of the present disclosure may be possible.

Accordingly, the true technical protection scope of the present disclosure should be defined by the following claims.

What is claimed is:

1. A spindle motor, comprising:
a rotor yoke coupled with a rotation axis and having an optical disk mounted thereon;
a clamp case that is arranged on the rotor yoke, inserted into an inner side of the optical disk and has a receiving groove formed on the side thereof; and
a chuck clip corresponding to the receiving groove and having one side fixed to a coupling grove of the clamp case and the other side that elastically supports the inner side of the optical disk,
wherein a portion of the chuck clip is bent in a curved line shape and disposed directly on the rotor yoke.

2. The spindle motor according to claim 1, wherein the clamp case includes a top plate having an inner diameter and an external diameter, an inner plate that is extended from the inner diameter in a pipe shape and coupled with the rotor yoke and an outer plate that is extended from the external diameter in the same direction as the inner plate, and the receiving groove is formed from the surface of the outer plate in the direction facing the inner plate.

3. The spindle motor according to claim 2, wherein the inner plate contacted with a top plane of the rotor yoke is formed having a first height, and the outer plate is formed having a second height lower than the first height so that a gap is formed between the outer plate and the top plane of the rotor yoke.

4. The spindle motor according to claim 2, wherein the chuck clip includes a first clip portion that is elastically supported to the inner side of the optical disk and a second clip portion that is bent starting from the first clip portion and coupled with the coupling groove.

5. The spindle motor according to claim 4, wherein the second clip portion is bent in a curved surface.

6. The spindle motor according to claim 4, wherein the first clip portion includes a first inclined plane that is outwardly bent from the outer plate with reference to the outer plate and a second inclined plane that is inwardly bent from the first inclined plane with reference to the outer plate.

7. The spindle motor according to claim 6, wherein the first inclined plane and the second inclined plane bent starting from the first inclined plane have an obtuse angle formed therebetween.

8. The spindle motor according to claim 6, wherein an angle formed between the yoke top plate of the rotor yoke formed in parallel to the clamp case and the first inclined plane is greater than an angle formed between the top plate and the second inclined plane.

9. The spindle motor according to claim 6, wherein the first inclined plane and the inner side of the optical disk have an acute angle formed therebetween.

10. The spindle motor according to claim 6, wherein the bent portion formed by the first and second inclined planes is outwardly projected from the receiving groove.

11. The spindle motor according to claim 4, wherein the first clip portion is formed in a curved plane that is projected with respect to the outer plate with reference to the outer plate.

12. The spindle motor according to claim 1, wherein the chuck clip includes a metal plate that is bent at least once in order to elastically support the inner side of the optical disk.

* * * * *